United States Patent
Li et al.

(10) Patent No.: US 12,262,074 B2
(45) Date of Patent: Mar. 25, 2025

(54) METHOD, DEVICE AND SYSTEM FOR TRANSMITTING DATA STREAM AND COMPUTER STORAGE MEDIUM

(71) Applicant: BOE Technology Group Co., Ltd., Beijing (CN)

(72) Inventors: Tao Li, Beijing (CN); Chaofeng Dong, Beijing (CN); Dongbo Cao, Beijing (CN); Kejun Hu, Beijing (CN); Jun Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 41 days.

(21) Appl. No.: 18/010,467

(22) PCT Filed: Jun. 16, 2021

(86) PCT No.: PCT/CN2021/100374
§ 371 (c)(1),
(2) Date: Dec. 15, 2022

(87) PCT Pub. No.: WO2021/254396
PCT Pub. Date: Dec. 23, 2021

(65) Prior Publication Data
US 2023/0269410 A1 Aug. 24, 2023

(30) Foreign Application Priority Data
Jun. 17, 2020 (CN) .......................... 202010555153.8

(51) Int. Cl.
*H04N 21/262* (2011.01)
*H04N 21/2187* (2011.01)
(52) U.S. Cl.
CPC ....... *H04N 21/262* (2013.01); *H04N 21/2187* (2013.01)

(58) Field of Classification Search
CPC ..................... H04N 21/262; H04N 21/2187
See application file for complete search history.

(56) References Cited

U.S. PATENT DOCUMENTS

| 6,081,523 A | 6/2000 | Merchant et al. |
| 10,560,215 B1 * | 2/2020 | Hegar ................ H04N 1/00007 |

(Continued)

FOREIGN PATENT DOCUMENTS

| CN | 1708042 A | 12/2005 |
| CN | 1792054 A | 6/2006 |

(Continued)

OTHER PUBLICATIONS

International Search Report and Written Opinion mailed on Sep. 1, 2021, in corresponding PCT/CN2021/100374, 25 pages.

(Continued)

*Primary Examiner* — Randy A Flynn
(74) *Attorney, Agent, or Firm* — XSENSUS LLP

(57) ABSTRACT

A method for transmitting data streams, applicable to a stream distributing device including a plurality of transmitters, includes: acquiring a data stream to be transmitted; acquiring, from the data stream, a plurality of data segments corresponding to the plurality of transmitters, wherein each of the transmitters corresponds to at least one data segment, and different transmitters correspond to different data segments; and transmitting the corresponding data segments to a stream combining device using the plurality of transmitters, such that the stream combining device transmits the data stream to a playing device in response to acquiring the data stream by combining the plurality of data segments.

16 Claims, 5 Drawing Sheets

(56) References Cited

U.S. PATENT DOCUMENTS

| | | | |
|---|---|---|---|
| 2004/0268206 A1 | 12/2004 | Kim et al. | |
| 2005/0276245 A1 | 12/2005 | Hidata | |
| 2006/0014499 A1 | 1/2006 | Gorokhov et al. | |
| 2009/0122753 A1* | 5/2009 | Hughes | H04W 40/16 370/329 |
| 2009/0290616 A1 | 11/2009 | Sridhara et al. | |
| 2012/0036544 A1* | 2/2012 | Chen | H04N 21/435 725/109 |
| 2013/0177294 A1* | 7/2013 | Kennberg | H04N 21/816 386/E9.011 |
| 2013/0310103 A1 | 11/2013 | Madan et al. | |
| 2015/0373075 A1* | 12/2015 | Perlman | H04N 21/00 709/217 |
| 2016/0191290 A1 | 6/2016 | Kim et al. | |
| 2018/0310287 A1 | 10/2018 | Zhang | |
| 2019/0082238 A1* | 3/2019 | Sengupta | H04N 21/258 |
| 2020/0344790 A1* | 10/2020 | Kadous | H04B 7/024 |

FOREIGN PATENT DOCUMENTS

| | | |
|---|---|---|
| CN | 101023616 A | 8/2007 |
| CN | 103152754 A | 6/2013 |
| CN | 103731241 A | 4/2014 |
| CN | 104335647 A | 2/2015 |
| CN | 105338258 A | 2/2016 |
| CN | 105392020 A | 3/2016 |
| CN | 105656798 A | 6/2016 |
| CN | 107040297 A | 8/2017 |
| CN | 108529921 A | 9/2018 |
| CN | 110418376 A | 11/2019 |
| CN | 111726647 A | 9/2020 |

OTHER PUBLICATIONS

Office Action issued on Sep. 8, 2021, in corresponding Chinese patent Application No. 202010555153.8, 17 pages.

Office Action issued on Mar. 7, 2022, in corresponding Chinese patent Application No. 202010555153.8, 8 pages.

Decision of Rejection issued on Aug. 17, 2022, in corresponding Chinese patent Application No. 202010555153.8, 16 pages.

* cited by examiner

METHOD, DEVICE AND SYSTEM FOR TRANSMITTING DATA STREAM AND COMPUTER STORAGE MEDIUM

CROSS-REFERENCE TO RELATED APPLICATION

This application is a US national phase application based on PCT/CN2021/100374, filed on Jun. 16, 2021, which claims priority to Chinese Patent Application No. 202010555153.8, filed on Jun. 17, 2020, and titled "DATA DISTRIBUTING DEVICE AND DATA PROCESSING SYSTEM", the disclosures of which are incorporated herein by reference in their entireties.

TECHNICAL FIELD

The present disclosure relates to a method, device and system for transmitting data streams.

BACKGROUND

With the rapid development of the Internet, a variety of social activities, such as press conferences, sports competitions, exhibitions, publicity, teleconferences, telecare, opening ceremonies of schools, opening ceremonies of companies, alumni gatherings, anniversaries and wedding ceremonies can be live-streamed online. During the live-streaming process, live-streaming data streams will be transmitted between a plurality of devices.

SUMMARY

The present disclosure provides a method, device and system for transmitting data streams.

In a first aspect, a method for transmitting a data stream is provided. The method is applicable to a stream distributing device including a plurality of transmitters, the method including:
acquiring a data stream to be transmitted;
acquiring, from the data stream, a plurality of data segments corresponding to the plurality of transmitters, wherein each of the transmitters corresponds to at least one data segment, and different transmitters correspond to different data segments; and
transmitting the corresponding data segments to a stream combining device using the plurality of transmitters, such that the stream combining device transmits the data stream to a playing device in response to acquiring the data stream by combining the plurality of data segments.

Optionally, a total length of all data segments corresponding to the transmitters is related to link parameters corresponding to the transmitters, wherein the link parameters corresponding to the transmitters are parameters of links between the transmitters and the stream combining device.

Optionally, the link parameters corresponding to the transmitters include intensities of signals transmitted on the links between the transmitters and the stream combining device, wherein the total length is positively related to the intensity of the signal.

Optionally, the plurality of data segments have an equal length.

Optionally, at least two of the data segments have different lengths.

Optionally, transmitting the corresponding data segments to the stream combining device using the plurality of transmitters includes:
acquiring a plurality of data packets which is in one-to-one correspondence to the plurality of data segments by encapsulating the plurality of data segments, wherein the data packet corresponding to each of the data segments includes the data segment and a serial number of the data segment, the serial number being configured to indicate an order of the data segment in the plurality of data segments; and
transmitting the data packets corresponding to the data segments to the stream combining device using the plurality of transmitters.

Optionally, data of the data stream is captured by a capture device, and each of the data packets further includes an identifier of the capture device.

Optionally, the plurality of transmitters include at least some of the transmitters in the stream distributing device, and the method further includes:
determining the plurality of transmitters based on the link parameters corresponding to the transmitters,
wherein the link parameters corresponding to the transmitters are parameters of links between the transmitters and the stream combining device.

Optionally, the link parameters corresponding to the transmitters are configured to reflect the quality of the links between the transmitters and the stream combining device; and
the plurality of transmitters are n transmitters with the highest link quality reflected by the corresponding link parameters in the stream distributing device, n>1.

Optionally, in at least one of the transmitters in the stream distributing device, the number of receive antennas is less than the number of transmit antennas.

In a second aspect, a method for transmitting a data stream is provided. The method is performed by a stream combining device and includes:
receiving a plurality of data segments transmitted by a stream distributing device using a plurality of transmitters;
acquiring a data stream by combining the plurality of data segments; and
transmitting the data stream to a playing device.

Optionally, receiving the plurality of data segments transmitted by the stream distributing device using the plurality of transmitters includes:
receiving a plurality of data packets transmitted by the stream distributing device using the plurality of transmitters, wherein the plurality of data packets are in one-to-one correspondence to the plurality of data segments, and the data packet corresponding to each of the data segments includes the data segment and a serial number of the data segment, the serial number being configured to indicate an order of the data segment in the plurality of data segments; and
acquiring the plurality of data segments and the serial numbers of the plurality of data segments by decapsulating the plurality of data packets; and
acquiring the data stream by combining the plurality of data segments includes:
acquiring the data stream by combining the plurality of data segments based on the orders indicated by the serial numbers of the plurality of data segments.

Optionally, data of the data stream is captured by a capture device, and each of the plurality of data packets includes an identifier of the capture device.

In a third aspect, a system for transmitting data streams is provided. The system includes a stream distributing device, a stream combining device and a playing device, wherein the stream distributing device includes a plurality of transmitters and is configured to acquire a data stream to be transmitted, acquire, from the data stream, a plurality of data segments corresponding to the plurality of transmitters, and transmit the corresponding data segments to the stream combining device using the plurality of transmitters, wherein each of the transmitters corresponds to at least one data segment, and different transmitters correspond to different data segments;

the stream combining device is configured to acquire the data stream by combining the plurality of data segments, and send the data stream to the playing device in response to receiving the plurality of data segments; and the playing device is configured to play the data stream in response to receiving the data stream.

Optionally, the system for transmitting the data streams further includes a capture device and an encoding device, wherein the capture device is configured to collect data of the data stream and transmit the captured data to the encoding device; the encoding device is configured to acquire the data stream by encoding the data transmitted by the capture device; and the playing device is configured to acquire the data of the data stream by decoding the data stream, and play the data in the data stream.

Optionally, the system for transmitting the data streams further includes a caching device, wherein the stream combining device is configured to transmit the data stream to the caching device, the caching device is configured to cache the data stream, and the playing device is configured to acquire the data stream cached by the caching device.

Optionally, the system for transmitting the data streams further includes a stream pulling device, wherein the playing device is configured to send an acquiring request for the data stream to the stream pulling device, and the stream pulling device is configured to pull the data stream from the caching device based on the acquiring request and transmit the data stream to the playing device.

Optionally, the system for transmitting the data streams further includes a transfer device, wherein the playing device is configured to send the acquiring request to the stream pulling device through the transfer device, and the stream pulling device is configured to transmit the data stream to the playing device through the transfer device.

In a fourth aspect, an apparatus for transmitting a data stream including a plurality of transmitters is provided. The apparatus for transmitting the data stream includes:

a first acquiring module configured to acquire a data stream to be transmitted;

a second acquiring module, configured to acquire, from the data stream, a plurality of data segments corresponding to the plurality of transmitters, wherein each of the transmitters corresponds to at least one data segment, and different transmitters correspond to different data segments; and a transmitting module configured to transmit the corresponding data segments to a stream combining device using the plurality of transmitters, such that the stream combining device transmits the data stream to a playing device in response to acquiring the data stream by combining the plurality of data segments.

Optionally, a total length of all data segments corresponding to the transmitters is related to link parameters corresponding to the transmitters, wherein the link parameters corresponding to the transmitters are parameters of links between the transmitters and the stream combining device.

Optionally, the link parameters corresponding to the transmitters include intensities of signals transmitted on the links between the transmitters and the stream combining device, wherein the total length is positively related to the intensity of the signal.

Optionally, the plurality of data segments have an equal length.

Optionally, at least two of the data segments have different lengths.

Optionally, the transmitting module is configured to:

acquire a plurality of data packets which is in one-to-one correspondence to the plurality of data segments by encapsulating the plurality of data segments, wherein the data packet corresponding to each of the data segments includes the data segment and a serial number of the data segment, the serial number being configured to indicate an order of the data segment in the plurality of data segments; and transmit the data packets corresponding to the data segments to the stream combining device using the plurality of transmitters.

Optionally, data in the data stream is captured by a capture device, and each of the data packets further includes an identifier of the capture device.

Optionally, the plurality of transmitters include at least some of the transmitters in the stream distributing device. The apparatus for transmitting the data stream further includes:

a determining module, configured to determine the plurality of transmitters based on the link parameters corresponding to the transmitters, wherein the link parameters corresponding to the transmitters are parameters of links between the transmitters and the stream combining device.

Optionally, the link parameters corresponding to the transmitters are configured to reflect the quality of the links between the transmitters and the stream combining device; and the plurality of transmitters are n transmitters with the highest link quality reflected by the corresponding link parameters in the stream distributing device, n>1.

Optionally, in at least one of the transmitters in the stream distributing device, the number of receive antennas is less than the number of transmit antennas.

In a fifth aspect, an apparatus for transmitting a data stream is provided. The apparatus includes:

a receiving module, configured to receive a plurality of data segments in the data stream transmitted by a stream distributing device using a plurality of transmitters;

a combining module, configured to acquire the data stream by combining the plurality of data segments; and a transmitting module, configured to transmit the data stream to a playing device.

Optionally, the receiving module is configured to:

receive a plurality of data packets transmitted by the stream distributing device using the plurality of transmitters, wherein the plurality of data packets is in one-to-one correspondence to the plurality of data segments, and the data packet corresponding to each of the data segments includes the data segment and a serial number of the data segment, the serial number being configured to indicate an order of the data segment in the plurality of data segments; and acquire the plurality of data segments and the serial numbers of the plurality of data segments by decapsulating the plurality of data packets; and the combining module is configured to acquire the data stream by combining the plurality of data segments based on the orders indicated by the serial numbers of the plurality of data segments.

Optionally, data in the data stream is captured by a capture device, and each of the plurality of data packets further includes an identifier of the capture device.

In a sixth aspect, a device for transmitting a data stream is provided. The device for transmitting the data stream includes a processor, a memory and a plurality of transmitters, wherein the memory is configured to store one or more programs therein; and the processor, when loading and running the one or more programs stored in the memory, causes the device for transmitting the data stream to perform the method for transmitting the data stream according to any design in the first aspect.

In a seventh aspect, a device for transmitting a data stream is provided. The device for transmitting the data stream includes a processor and a memory, wherein the memory is configured to store one or more programs therein; and the processor, when loading and running the one or more programs stored in the memory, causes the device for transmitting the data stream to perform the method for transmitting the data stream according to any design in the second aspect.

In an eighth aspect, a non-transitory computer-readable storage medium is provided. The non-transitory computer-readable storage medium is configured to store one or more computer programs therein, wherein the one or more computer programs, when loaded and run by a computer, causes the computer to perform the method for transmitting the data stream according to any design in the first aspect.

In a ninth aspect, a non-transitory computer-readable storage medium is provided. The non-transitory computer-readable storage medium is configured to store one or more computer programs therein, wherein the one or more computer programs, when loaded and run by a computer, causes the computer to perform the method for transmitting the data stream according to any design in the second aspect.

DETAILED DESCRIPTION

The present disclosure will be further described below in conjunction with the accompanying drawings and embodiments. It can be understood that the specific embodiments described here are only configured to explain the related art, but not intended to limit the present disclosure. In addition, it should be noted that, for ease of description, only the parts related to the present disclosure are shown in the accompanying drawings.

It should be noted that the embodiments in the present disclosure and the features in the embodiments can be combined with each other without conflict. The present disclosure will be described below in detail with reference to the accompanying drawings and in conjunction with embodiments.

At present, in the case that a device transmits a data stream to another device, the device uses a transmitter of it to transmit the data stream to the other device. However, in the case that the data volume of the data stream is larger (for example, the data stream is a video data stream with a higher resolution (such as 4K resolution or 8K resolution)), the device is less efficient to transmit the data stream using its transmitter due to the limited bandwidth of the transmitter in this device. In the case that the data stream is a live-streaming data stream or an on-demand data stream, a playing terminal may experience a stuttering event in the playing course of the data stream in response to the other device providing the data stream to the playing terminal.

An embodiment of the present disclosure provides a method for transmitting a data stream. According to the method, the data stream is transmitted through a plurality of transmitters, so as to effectively improve the transmission efficiency of the data stream.

Figure 1:
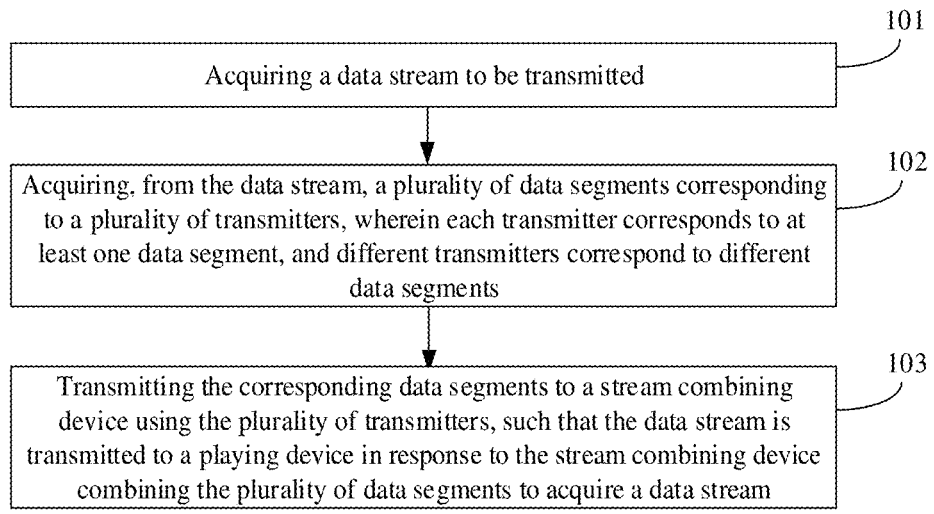
FIG. 1 is a flowchart of a method for transmitting a data stream according to an embodiment of the present disclosure.

In an exemplary embodiment, FIG. 1 is a flowchart of a method for transmitting a data stream according to an embodiment of the present disclosure. The method may be performed by a stream distributing device. As shown in FIG. 1, the method includes the following steps.

In 101, a data stream to be transmitted is acquired.

The data stream to be transmitted may be a data stream received by the stream distributing device or a data stream generated by the stream distributing device, which is not limited in this embodiment of the present disclosure.

Optionally, in the case that the data stream is the data stream received by the stream distributing device, the data stream may be a data stream transmitted to the stream distributing device in response to the data captured by a capture device being encoded by the encoding device. The capture device is communicatively connected to the encoding device, and the encoding device is communicatively connected to the stream distributing device.

In 102, a plurality of data segments corresponding to a plurality of transmitters is acquired from the data stream, wherein each transmitter corresponds to at least one data segment, and different transmitters correspond to different data segments.

It should be noted that the stream distributing device includes a plurality of (such as 2, 3 or 4) transmitters, wherein each transmitter may be a component capable of transmitting data and at least includes a sender, and the transmitter may also include a receiver.

In the embodiment of the present disclosure, the transmitter may be a 5th generation mobile communication technology (5G) module, a 4th generation mobile communication technology (4G) module, or the like. The module (such as a 5G module) includes a baseband chip, as well as radio frequency, storage, power management and other hardware, and the module can establish a communication connection with the stream combining device.

The plurality of transmitters in 102 may be part of the transmitters in the stream distributing device, or may be all the transmitters in the stream distributing device, which is not limited in this embodiment of the present disclosure.

In 102, the stream distributing device may split the data stream acquired in 101 into a plurality of data segments, wherein the plurality of data segments are corresponding to the plurality of transmitters, each transmitter may correspond to at least one data segment, and the data segments corresponding to the plurality of transmitters constitute the plurality of data segments.

In 103, the corresponding data segments are transmitted to the stream combining device using the plurality of transmitters, such that the stream combining device transmits the data stream to a playing device in response to acquiring the data stream by combining the plurality of data segments.

Each of the transmitters in the stream distributing device is communicatively connected to the stream combining device. In response to acquiring the data segment corresponding to each transmitter, the stream distributing device may transmit the data segment corresponding to the transmitter to the stream combining device using the transmitter. In this way, the stream distributing device is capable of transmitting the plurality of data segments to the stream combining device through the plurality of transmitters.

In summary, in the method for transmitting the data stream provided by the embodiment of the present disclosure, the stream distributing device transmits the corresponding data segments to the stream combining device using the plurality of transmitters, such that the plurality of transmitters may transmit the data segments to the stream combining device in parallel. The stream combining device may acquire the data stream by combining the plurality of data segments in response to receiving the plurality of data segments. In this way, the stream distributing device can transmit the data stream to the stream combining device. Because the sum of the bandwidths of the plurality of transmitters is larger, the efficiency of transmitting the data stream by the stream distributing device to the stream combining device is higher.

Figure 2:
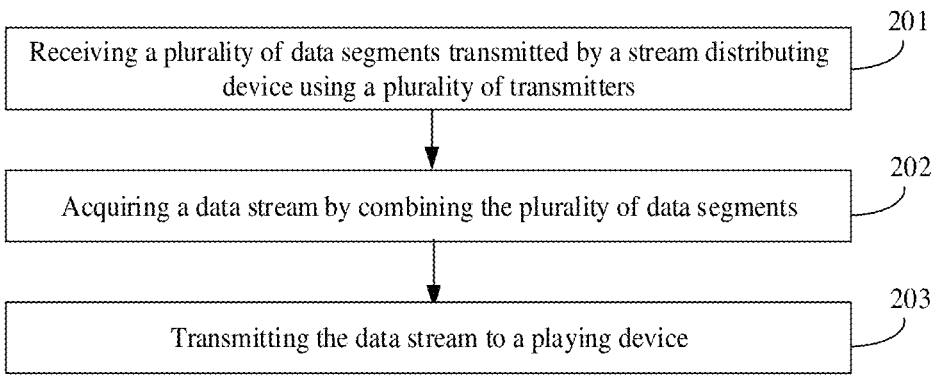
FIG. 2 is a flowchart of another method for transmitting a data stream according to an embodiment of the present disclosure.

In another exemplary embodiment, FIG. 2 is a flowchart of another method for transmitting a data stream according to an embodiment of the present disclosure. The method may be performed by a stream combining device. As shown in FIG. 2, the method includes the following steps.

In 201, a plurality of data segments transmitted by a stream distributing device using a plurality of transmitters is received.

The stream combining device may establish communication connections with the plurality of transmitters in the stream distributing device. In 201, the stream combining device may receive the plurality of data segments transmitted by the stream distributing device using the plurality of transmitters based on these communication connections.

The 201 may refer to the relevant descriptions in the steps 102 and 103, which is not repeated in the embodiment of the present disclosure.

In 202, the plurality of data segments is combined to acquire a data stream.

In the embodiment of the present disclosure, the stream distributing device can split the data stream into a plurality of data segments corresponding to the plurality of transmitters based on a certain rule, and transmit the corresponding data segments to the stream combining device using the plurality of transmitters. Correspondingly, the stream combining device may recombine these data segments into the above-mentioned data stream in response to receiving these data segments based on a rule opposite to this certain rule.

In an exemplary embodiment, it is assumed that the plurality of data segments is in one-to-one correspondence to the plurality of transmitters, and the plurality of transmitters is arranged in a certain order. The stream distributing device may allocate the data segments acquired by splitting to the plurality of transmitters in sequence according to the order of the plurality of transmitters, and the data segment allocated to each of the transmitters is a data segment corresponding to the transmitter. Then, the stream combining device may recombine the data segments transmitted by these transmitters into the above data stream according to the order of the plurality of transmitters.

For example, the plurality of transmitters includes transmitters 1, 2, and 3, and the order of the three transmitters is transmitters 1, 2, and 3. The data stream includes data segments 1, 2 and 3 arranged in sequence. The stream distributing device may allocate the data segment 1 to the transmitter 1 (the transmitter 1 corresponds to the data segment 1), the data segment 2 to the transmitter 2 (the transmitter 2 corresponds to the data segment 2), and the data segment 3 to the transmitter 3 (the transmitter 3 corresponds to the data segment 3). According to the order of the three transmitters, the stream combining device can rank the data segment 1 transmitted by the transmitter 1 in the first place, the data segment 2 transmitted by the transmitter 2 in the second place, and the data segment 3 transmitted by the transmitter 3 in the third place, thereby acquiring a data stream consisting of the data segments 1, 2, and 3.

In another exemplary embodiment, in the case that the stream distributing device transmits the corresponding data segments transmitted by the transmitters, the stream distributing device may encapsulate the plurality of data segments to acquire a plurality of data packets in one-to-one correspondence to the plurality of data segments, wherein the data packet corresponding to each of the data segments includes the data segment and a serial number of the data segment, and the serial number is configured to indicate an order of the data segment in the plurality of data segments. Then, the stream distributing device may transmit the data packets corresponding to the data segments to the stream combining device using the plurality of transmitters. The stream combining device may parse these data packets in response to receiving the plurality of data packets to acquire the plurality of data segments and the serial number of each data segment. Then, the stream combining device may recombine the plurality of data segments into the data stream according to the orders indicated by the serial numbers of the plurality of data segments.

For example, the plurality of transmitters includes transmitters 1, 2, and 3, and the data stream includes data segments 1, 2, 3, 4, 5, and 6 arranged in sequence. It is assumed that the stream distributing device may allocate the data segments 1, 2 and 3 to the transmitter 1 (the transmitter 1 corresponds to the data segments 1, 2 and 3), the data segments 4 and 5 to the transmitter 2 (the transmitter 2 corresponds to the data segments 4 and 5), and the data segment 6 to the transmitter 3 (the transmitter 3 corresponds to the data segment 6). The stream distributing device may further encapsulate the data segment 1 as a data packet 1 (including the data segment 1 and its serial number 1), the data segment 2 as a data packet 2 (including the data segment 2 and its serial number 2), the data segment 3 as a data packet 3 (including a data segment 3 and its serial number 3), the data segment 4 as a data packet 4 (including the data segment 4 and its serial number 4), the data segment 5 as a data packet 5 (including the data segment 5 and its serial number 5), and the data segment 6 as a data packet 6 (including the data segment 6 and its serial number 6).

In response to receiving the six data packets, the stream combining device may parse the six data packets to acquire the data segment 1 and its serial number 1, the data segment 2 and its serial number 2, the data segment 3 and its serial number 3, the data segment 4 and its serial number 4, the data segment 5 and its serial number 5, and the data segment 6 and its serial number 6. Finally, the stream combining device may arrange the six data segments as the data segments 1, 2, 3, 4, 5, and 6 according to the serial numbers of the data segments to acquire the above-mentioned data stream.

In 203, the acquired data stream is transmitted to a playing device.

In summary, in the method for transmitting the data stream provided by the embodiment of the present disclosure, the stream distributing device transmits the corresponding data segments to the stream combining device using the plurality of transmitters, such that the plurality of transmitters may transmit the data segments to the stream combining device in parallel. The stream combining device may acquire the data stream by combining the plurality of data segments in response to receiving the plurality of data segments. In this way, the stream distributing device can transmit the data stream to the stream combining device. Because the sum of the bandwidths of the plurality of transmitters is larger, the efficiency of transmitting the data stream by the stream distributing device to the stream combining device is higher.

Figure 3:
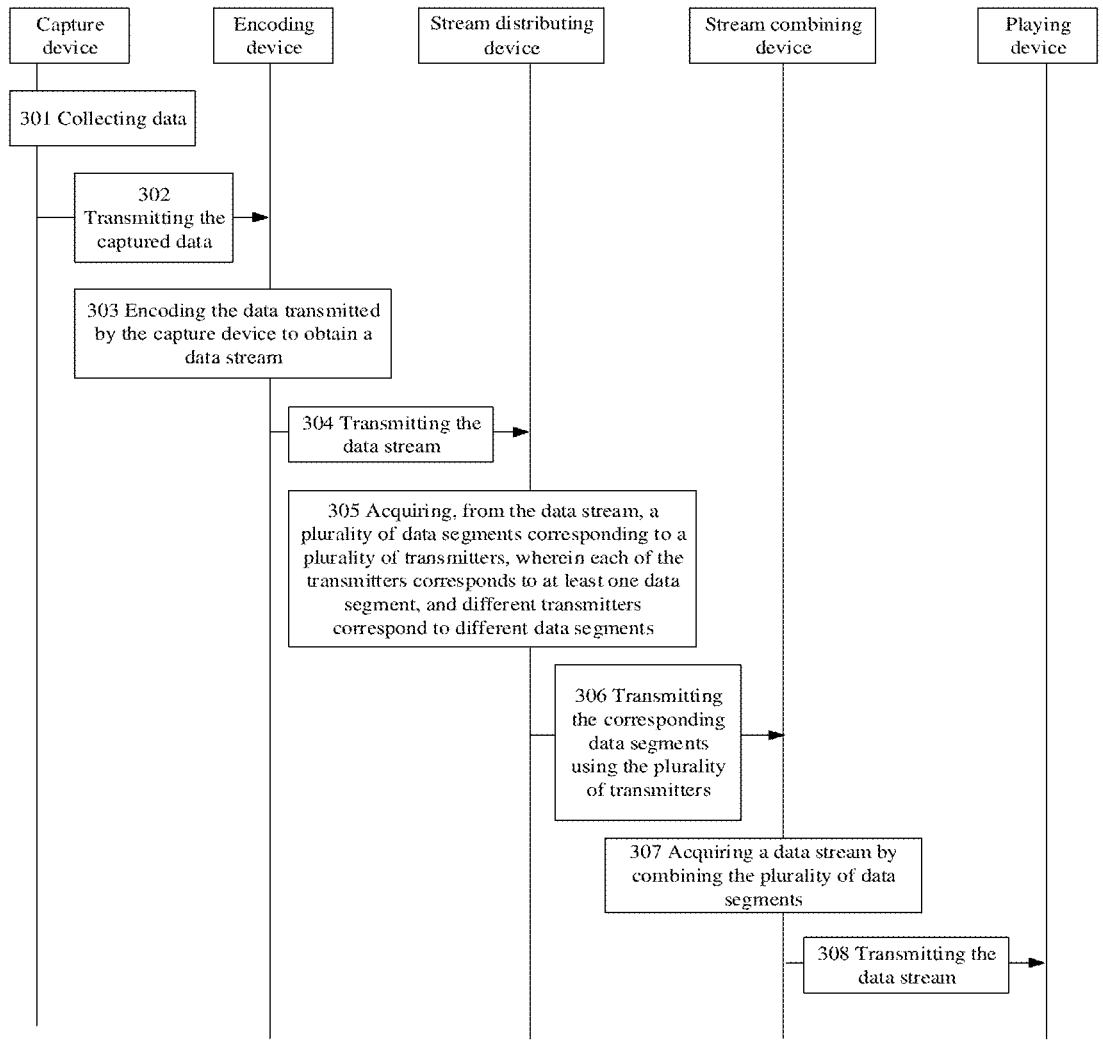
FIG. 3 is a flowchart of still another method for transmitting a data stream according to an embodiment of the present disclosure.

In still another embodiment, FIG. 3 is a flowchart of still another method for transmitting a data stream according to an embodiment of the present disclosure. As shown in FIG. 3, the method includes the following steps.

In 301, data is captured by a capture device.

The data captured by the capture device may be audio data, video data, or multimedia data, etc. The types of the data are not limited in the embodiments of the present disclosure. The video data may be video data of high-definition resolution such as 4K resolution or 8K resolution.

The capture device may be any device capable of collecting data, such as a mobile phone, a video camera, or a tablet computer.

Optionally, the data captured by the capture device may be serial digital interface (SDI) data.

In 302, the capture device transmits the captured data to an encoding device.

The capture device is communicatively connected to the encoding device, and the capture device may transmit the captured data to the encoding device, such that the encoding device encodes the data captured by the capture device in 303 to acquire the data stream.

The communication connection in the embodiment of the present disclosure may be a communication connection based on a wired network or a communication connection based on a wireless network, which is not limited in this embodiment of the present disclosure. The network may be Internet, a local area network (LAN), a metropolitan area network (MAN), a wide area network (WAN), a mobile network, a private network, or a virtual private network, or any combination of these networks.

In 303, the encoding device encodes the data transmitted by the capture device to acquire a data stream.

Optionally, in the case that the data captured by the capture device includes video, the encoding device may be a video encoding device, and an encoding mode adopted by the encoding device may be an inter-frame encoding mode.

In 304, the encoding device transmits the data stream to a stream distributing device.

The encoding device is communicatively connected to the stream distributing device, and the encoding device may transmit the encoded data stream to the stream distributing device, such that the stream distributing device acquires the data stream, and then shunts the data stream through subsequent steps.

Optionally, the encoding device may transmit the data stream to the stream distributing device based on a data transmission protocol, for example, transmit the data stream to the stream distributing device based on a transmission control protocol/Internet protocol (TCP/IP).

In 305, the stream distributing device acquires, from the data stream, a plurality of data segments corresponding to a plurality of transmitters, wherein each transmitter corresponds to at least one data segment, and different transmitters correspond to different data segments.

The step 305 may refer to the above step 102, which is not repeated here in the embodiments of the present disclosure.

Optionally, the data segment corresponding to each of the transmitters is a data segment that needs to be transmitted by the transmitter. Parameters of a link between each transmitter and the stream combining device are related to the efficiency with which the transmitter transmits the data segment to the stream combining device. In order to make reasonable use of these transmitters, the stream distributing device may allocate the corresponding data segments to the transmitters according to the parameters of the links between the transmitters and the stream combining device (referred to as link parameters corresponding to the transmitters). At this time, a total length of all data segments corresponding to the transmitters is related to link parameters corresponding to the transmitters.

In an exemplary embodiment, the link parameters corresponding to the transmitters include intensities of signals transmitted on the links between each transmitter and the stream combining device. In this case, the total length of all data segments corresponding to the transmitters is positively related to the intensity of this signal. In other words, the higher intensity of the signal transmitted on the link between each of the transmitters and the stream combining device, the more efficient the transmitter transmits the data segment, and then the greater total length of all data segments that can be allocated by the stream distributing device to the transmitter.

For example, the plurality of transmitters includes transmitters 1, 2 and 3, wherein the intensity of the signal transmitted on the link between the transmitter 1 and the stream combining device is Intensity 1, the intensity of the signal transmitted on the link between the transmitter 2 and the stream combining device is Intensity 2, and the intensity of the signal transmitted on the link between the transmitter 3 and the stream combining device is Intensity 3. The total length of all data segments corresponding to the transmitter 1 is Length 1, the total length of all data segments corresponding to the transmitter 2 is Length 2, and the total length of all data segments corresponding to the transmitter 3 is Length 3. In the case that Intensity 1>Intensity 2>Intensity 3, Length 1>Length 2>Length 3.

In the embodiment of the present disclosure, the link parameters corresponding to each transmitter include the intensity of the signal transmitted on the link between the transmitter and the stream combining device. Optionally, the link parameters corresponding to each of the transmitters may also be other parameters of the connection, such as a transmission delay and a transmission rate. The transmission delay is a duration from the transmitter transmitting a data packet to the stream combining device to the transmitter receiving a response packet of the data packet transmitted by the stream combining device.

In an exemplary embodiment, it is assumed that the link parameters corresponding to each transmitter include the intensity of the signal transmitted on the link between the transmitter and the stream combining device, and a transmission rate of the link between the transmitter and the stream combining device. The stream distributing device includes n transmitters, and the total length of the data stream is T. A total length of all data segments corresponding to the $i^{th}$ transmitter is $Li=(Si/S)*T*Xi$, wherein $1 \leq i \leq n$, Si represents the transmission rate of the link between the $i^{th}$ transmitter and the stream combining device, S represents a sum of the transmission rates of the links between n transmitters and the stream combining device, and Xi is related to the intensity of a signal transmitted on the link between the $i^{th}$ transmitter and the stream combining device. For example, Xi is a ratio of the intensity of this signal to the total signal intensity, and the total signal intensity is a sum of the intensities of the signals transmitted on the links between the n transmitters and the stream combining device.

There is a corresponding relationship between the plurality of transmitters and the plurality of data segments. The plurality of transmitters may be in one-to-one correspondence to the plurality of data segments, or the plurality of transmitters may not be in one-to-one correspondence to the plurality of data segments. Regardless of how the plurality of transmitters correspond to the plurality of data segments, the plurality of data segments may have an equal length, or at least two of the plurality of data segments may have different lengths.

Optionally, in the case that the plurality of data segments have an equal length, the stream distributing device may determine the number of data segments corresponding to each of the transmitters according to the link parameters corresponding to the transmitter, and allocate data segments corresponding to the number of data segments to the transmitter.

Also optionally, in the case that at least two of the plurality of data segments have different lengths, the stream distributing device may determine the length of each of the data segments corresponding to each of the transmitters according to the link parameters corresponding to the transmitter, and allocate a data segment corresponding to the length of the data segment to this transmitter.

Further, the plurality of transmitters may include at least some of the transmitters in the stream distributing device. In this case, the stream distributing device may determine the plurality of transmitters according to the link parameters corresponding to the transmitters.

In an exemplary embodiment, the link parameters corresponding to each transmitter are configured to reflect the quality of the link between the transmitter and the stream combining device. The plurality of transmitters determined by the stream distributing device are n transmitters with the highest link quality reflected by the corresponding link parameters in the stream distributing device, n>1. In this way, it can be ensured that the quality of the links between each of the plurality of transmitters configured to transmit the data stream and the stream combining device is higher, and the efficiency with which the plurality of transmitters transmits the data stream is higher.

For example, it is assumed that the stream distributing device includes transmitters 1, 2, 3, 4 and 5, and n=3. The link parameters corresponding to each of the transmitters include the intensity of a signal transmitted on the link between the transmitter and the stream combining device. The intensity of the signal transmitted on the link between the transmitter 1 and the stream combining device is Intensity 1, the intensity of the signal transmitted on the link between the transmitter 2 and the stream combining device is Intensity 2, the intensity of the signal transmitted on the link between the transmitter 3 and the stream combining device is Intensity 3, the intensity of the signal transmitted on the link between the transmitter 4 and the stream combining device is Intensity 4, and the intensity of the signal transmitted on the link between the transmitter 5 and the stream combining device is Intensity 5. In the case that Intensity 1>Intensity 2>Intensity 3>Intensity 4>Intensity 5, the plurality of transmitters determined by the stream distributing device may be transmitters 1, 2 and 3.

In the case that the stream distributing device is just started, the stream distributing device may transmit a detection packet to the stream combining device by the transmitter to measure the parameters of the link between the transmitter and the stream combining device. In response to the stream distributing device operating for a period of time, the stream distributing device may determine the parameters of the link according to a data transmission situation on the link during the operation period.

Optionally, in response to acquiring the link parameters corresponding to the transmitters, the stream distributing device may determine the data segments corresponding to the transmitters and the plurality of transmitters based on the link parameters each time the stream distributing device transmits the data stream to the stream combining device. The stream distributing device may also update the acquired link parameters, and determine the data segments corresponding to the transmitters and the plurality of above transmitters based on the updated link parameters, which is not limited in the embodiment of the present disclosure.

In 306, the stream distributing device transmits the corresponding data segments to the stream combining device using the plurality of transmitters.

The step 306 may refer to the relevant content in the steps 103 and 202, which are not repeated in the embodiment of the present disclosure.

Optionally, in the case that the stream distributing device transmits the data segment included in the data packet to the stream combining device in a manner by which the transmitter transmits the data packet to the stream combining device, the data packet not only includes the data segment and the serial number of the data segment, but also includes an identifier of the capture device.

Figure 4:
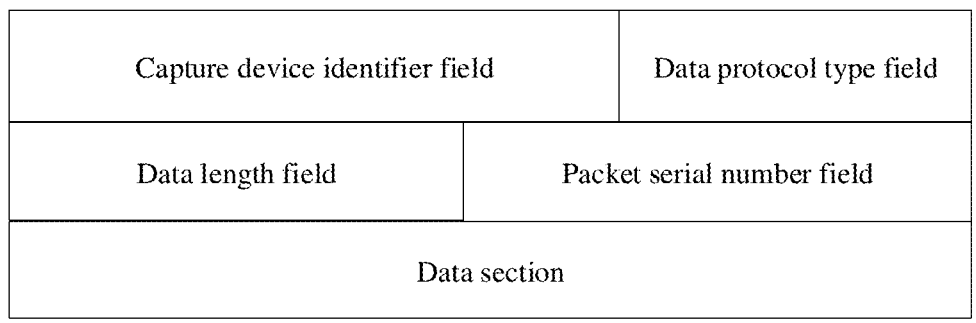
FIG. 4 is a schematic structural diagram of a data packet according to an embodiment of the present disclosure.

In an exemplary embodiment, the structure of the data packet may be shown in FIG. 4. The data packet includes a capture device identifier (Resource ID) field, a data protocol type field, a data length field, and a packet serial number field and a data section which are arranged in sequence. The capture device identifier field includes the identifier of the capture device, the data protocol type field includes a type of an encapsulation protocol of the data packet, the data length field includes the length of the data section, the packet serial number field includes a serial number of an encapsulated data segment, and the data section includes an encapsulated data segment.

The capture device identifier field may include 7 bytes, and the serial number field may include 4 bytes. The type of the encapsulation protocol in the data protocol type field may be any type, such as a real-time transport protocol (RTP), a real time messaging protocol (RTMP), or a transmission control protocol (TCP).

Further, the data packet may further include a first source address and a first destination address, wherein the first source address is an address of a transmitter that transmits the data packet, and the first destination address is an address of the stream distributing device. The address in the embodiment of the present disclosure may be a physical address or a network address, which is not limited in this embodiment of the present disclosure.

In 307, the stream combining device combines the plurality of data segments to acquire a data stream.

The step 307 may refer to the relevant content in the step 202, which is not repeated here in the embodiment of the present disclosure.

Optionally, when the stream distributing device transmits the data segment included in the data packet to the stream combining device in a manner by which the transmitter transmits the data packet to the stream combining device, in the case that the data packet includes the identifier of the capture device, the stream combining device may determine, among the received data segments, the data segments that include the identifier of the same capture device. Then, the stream combining device may combine the data segments including the identifier of the same capture device to acquire the data stream. In this way, the method provided by the embodiment of the present disclosure may be applicable to scenarios in which data is captured by a plurality of capture devices.

Optionally, the stream combining device may classify the received data packets by artificial intelligence identification, wherein the data packets classified into one category include the identifier of the same capture device.

For example, the stream distributing device may extract statistical features of a plurality of data packets to establish a plurality of sample data, wherein the sample data includes category labels of the data packets. Next, the stream distributing device may learn the plurality of sample data through a machine learning model to establish a classification model, and then classify the received data packets by the trained classification model. For example, a convolutional neural network (CNN) model is trained by a gradient descent to acquire the classification model.

In the embodiment of the present disclosure, the stream combining device may also be referred to as a stream pushing device. The capture device transmits the captured data to the stream pushing device through the encoding device and the stream distributing device. This process can be referred as stream pushing. There are three pushing protocols used in stream pushing, i.e., a real time streaming protocol (RTSP), a real time messaging protocol (RTMP), and a hypertext transfer protocol (HTTP)-based HTTP live streaming (HLS) protocol.

In 308, the stream combining device transmits the data stream to a playing device.

In 309, the playing device decodes the data stream to acquire data of the data stream.

In 310, the playing device plays the data of the data stream.

In response to acquiring the data stream, the stream combining device may transmit the data stream to the playing device, such that the playing device decodes the data stream to acquire the data of the data stream, and then play the data.

The playing device in the present disclosure may be a desktop computer, a notebook computer, a smart phone, a tablet computer, smart glasses, etc., but is not limited thereto.

In summary, in the method for transmitting the data stream provided by the embodiment of the present disclosure, the stream distributing device transmits the corresponding data segments to the stream combining device using the plurality of transmitters, such that the plurality of transmitters may transmit the data segments to the stream combining device in parallel. The stream combining device may acquire the data stream by combining the plurality of data segments in response to receiving the plurality of data segments. In this way, the stream distributing device can transmit the data stream to the stream combining device. Because the sum of the bandwidths of the plurality of transmitters is larger, the efficiency of transmitting the data stream by the stream distributing device to the stream combining device is higher.

Further, in an embodiment of the present disclosure, the stream distributing device includes at least two transmitters. Each of the transmitters may include a sender and a receiver, and may transmit data segments to the stream distributing device by using the sender therein, and receive data transmitted by the stream distributing device by using the receiver therein.

The sender includes a transmit antenna, and the receiver includes a receive antenna. The frequency bands of the respective antennas in the stream distributing device may be the same or different. For example, the antennas in the stream distributing device may be antennas with frequency band numbers of N79, N78, N41, and the like. In the case that the transmitter is a 5G module, the antenna in the stream distributing device may be a 5G antenna or a 4th generation mobile communication technology (4G) antenna.

The stream distributing device may include a casing, and both the transmit antenna and the receive antenna may be disposed close to the inner side of the casing.

Optionally, in at least one of the transmitters of the stream distributing device, the number of the receive antennas is less than the number of the transmit antennas. Because the transmitters are primarily configured to transmit data to the stream combining device, at least one transmitter may include fewer receive antennas than transmit antennas. In addition, in the case that the receive antennas are fewer, an area occupied by the antenna inside the casing on the inner side of the casing can be reduced, and more transmit antennas can be arranged within a limited space.

Figure 5:
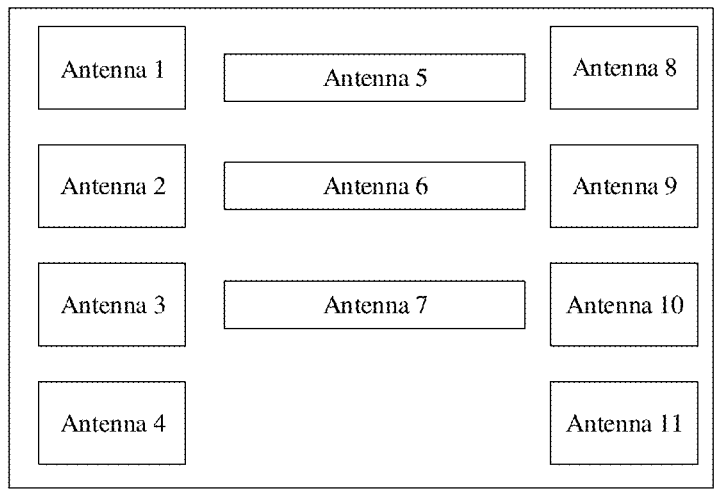
FIG. 5 is a schematic diagram of the layout of an antenna according to an embodiment of the present disclosure.

In an exemplary embodiment, assuming that each transmitter of the stream distributing device adopts 2-2 multiple-in multiple-out (MIMO) antennas, each transmitter includes two transmit antennas and two receive antennas. In the case that the stream distributing device includes three transmitters, the stream distributing device should include six transmit antennas and six receive antennas, for a total of twelve antennas. In the embodiment of the present disclosure, one receive antenna may be omitted from a certain transmitter. For example, referring to FIG. 5, the antennas 1, 2, 3 and 4 are the antennas of the transmitter 1, wherein the antennas 1 and 2 are both transmit antennas, and the antennas 3 and 4 are both receive antennas. The antennas 5, 6 and 7 are the antennas of the transmitter 2, wherein the antennas 5 and 6 are both transmit antennas, and the antenna 7 is the receive antenna. The antennas 8, 9, 10 and 11 are the antennas of the transmitter 3, wherein the antennas 8 and 9 are both transmit antennas, and the antennas 10 and 11 are both receive antennas. It can be seen that one receive antenna may be omitted from the transmitter 2.

In 308, the stream combining device needs to transmit the data stream to the playing device. It should be noted that the stream combining device may transmit the data stream to the playing device in any of a variety of ways, and the following takes one of the ways as an example for explanation.

Figure 6:
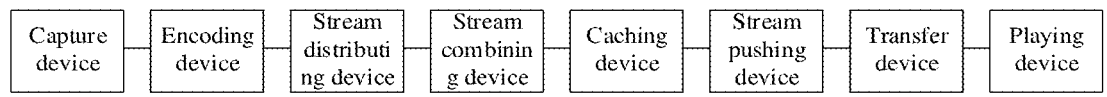
FIG. 6 is a flowchart of a method for transmitting a data stream form a stream combining device to a playing device according to an embodiment of the present disclosure.
Figure 7:
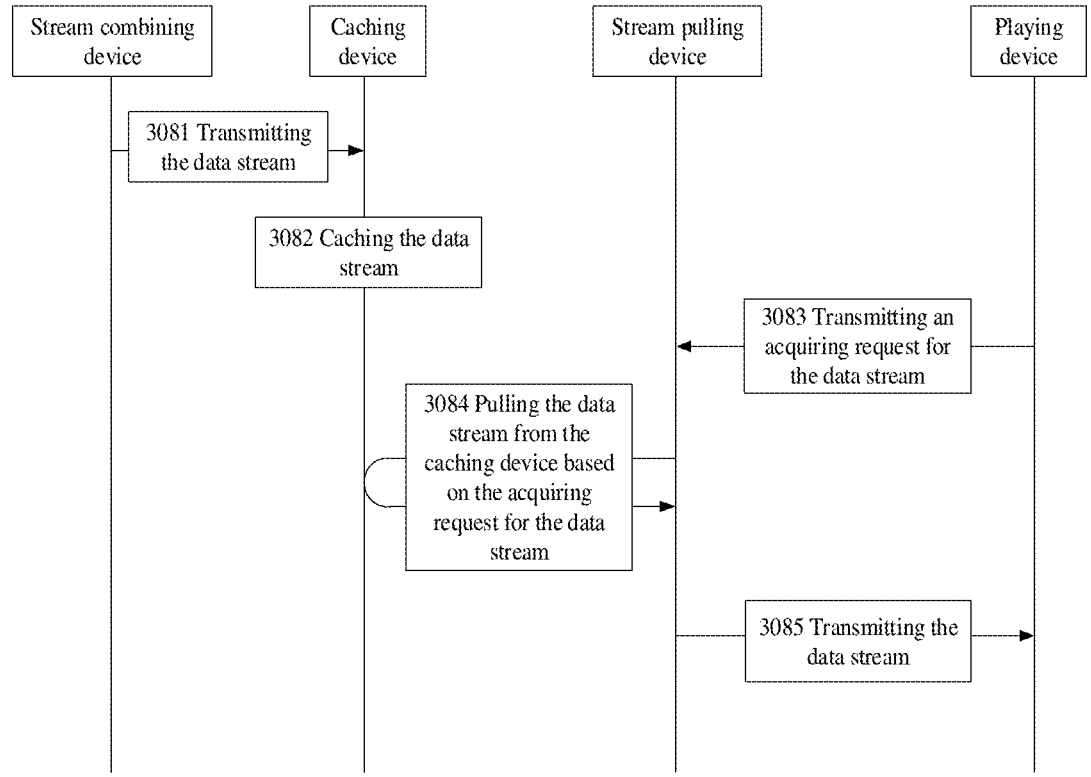
FIG. 7 is a schematic diagram of an application scenario according to an embodiment of the present disclosure.

In an exemplary embodiment, FIG. 6 is a flowchart of a method of transmitting a data stream to a playing device by a stream combining device according to an embodiment of the present disclosure. The method shown in FIG. 6 is applicable to a scenario shown in FIG. 7. As shown in FIG. 7, this scenario includes a capture device, an encoding device, a stream combining device, a caching device, a stream pulling device, a transfer device, and a playing device which are communicatively connected in sequence. The explanations of the capture device, the encoding device, the stream combining device and the playing device may refer to the relevant explanations in the above embodiments, which are not repeated in the embodiment of the present disclosure. The caching device, the stream pulling device and the transfer device may all be servers, and the caching device, the stream pulling device and the transfer device may constitute a cloud resource platform.

The method shown in FIG. 6 is described below with reference to FIG. 7. As shown in FIG. 6, the step 308 may include the following steps.

In 3081, the stream combining device transmits the data stream to the caching device.

In the case that the stream combining device transmits the data stream to the caching device, the stream combining device may also encapsulate data of the data stream (e.g., based on TCP encapsulation) to acquire a second data packet, and transmit the second data packet to the caching device. The second data packet includes the data of the data stream, and also includes a second source address and a second destination address. The second source address is an address of the stream combining device, and the second destination address is a storage address of the data stream on the caching device.

The stream combining device acquires a plurality of such second packets, and each of the second data packets may also include a packet serial number (configured to indicate an order of the second data packet). The stream combining device may sequentially add the second data packets to a cache queue, and transmit the second data packets in the cache queue to the caching device in sequence.

The structure of the second data packet transmitted by the stream combining device to the caching device may be different from or the same as the structure of a data packet (which may be referred to as a first data packet) transmitted by the stream distributing device to the stream combining device, which is not limited in the embodiment of the present disclosure.

Optionally, prior to transmitting the data stream to the caching device, the stream combining device may also determine whether the communication connection between the stream combining device and the caching device is faulty. In the case that the communication connection is not faulty, the stream combining device may transmit the data stream to the caching device.

In 3082, the caching device caches the data stream.

In response to acquiring the data stream, the stream combining device may transmit the data stream to the caching device, such that the data stream is cached in the caching device.

In 3083, the playing device transmits an acquiring request for the data stream to the stream pulling device.

In an exemplary embodiment, the playing device may generate the acquiring request for the data stream in response to the user's operation on the playing device, and transmit the acquiring request to the stream pulling device. The acquiring request may include an identifier of the data stream. The identifier of the data stream may be an identifier of the capture device that collects the data of the data stream, or an identifier that has a mapping relationship with the identifier of the capture device.

For example, in the case that a live-streaming viewer client clicks a live-streaming room number to enter a live-streaming room, the playing device transmits the acquiring request for the data stream to the stream pulling device. The acquiring request includes the identifier of the data stream, such as an identifier of the capture device that collects the data stream, an anchor's room number, or an anchor's username.

Optionally, the playing device may transmit the acquiring request to the stream pulling device through the transfer device. For example, the playing device may transmit the acquiring request to the transfer device, and the transfer device may forward the acquiring request to the stream pulling device.

In 3084, the stream pulling device pulls the data stream from the caching device based on the acquiring request for the data stream.

In response to receiving the acquiring request for the data stream, the stream pulling device pulls the data stream from the caching device. The data stream pulled by the stream pulling device may be cached in a pulled stream management pool of the stream pulling device.

Optionally, in response to receiving the acquiring request for the data stream, the stream pulling device may first determine whether the identifier of the data stream in the acquiring request is present or not. For example, the stream pulling device can determine whether the identifier of the data stream in the acquiring request is present or not according to a data stream identifier list. In the case that the identifier of the data stream in the acquiring request belongs to the data stream identifier list, the stream pulling device may determine that the identifier of the data stream in the acquiring request is present. In the case that the identifier of the data stream in the acquiring request is present, the stream pulling device pulls the data stream corresponding to the identifier of the capture device from the caching device.

In the case that the stream pulling device pulls the data stream from the caching device, the stream pulling device may send the identifier of the data stream in the acquiring request to the caching device, for example, send a connecting request including the identifier to the caching device. In the case that the caching device receives the identifier of the data stream, in response to determining that the identifier of the data stream is present, and the caching device stores the data stream corresponding to the identifier of the data stream, the caching device may transmit the data stream to the stream pulling device.

Optionally, prior to transmitting the identifier of the data stream to the caching device, the stream pulling device may also send a subscription message to the caching device, and then the caching device may push the identifier of at least one data stream to the stream pulling device based on the subscription message. Optionally, the data stream identifier list in the stream pulling device may include the identifier of the at least one data stream pushed by the caching device. The data stream identifier list may also be a list pre-stored on a stream pulling server, which is not limited in this embodiment of the present disclosure.

In 3085, the stream pulling device transmits the data stream to the playing device.

In an exemplary embodiment, the stream pulling device may transmit the data stream to the playing device through the transfer device. For example, the stream pulling device may transmit the data stream to the transfer device, and the transfer device may forward the data stream to the playing device.

In the case that a transmission protocol used between the stream pulling device and the playing device is RTMP, the playing device needs to include a player that supports a RTMP streaming protocol. For example, in the case that the playing device is a computer, the computer needs to include a video Lan client (VLC), and in the case that the playing device is a mobile phone, the mobile phone needs to include a Vitamio (a kind of client name) client.

Through the above steps 3083, 3084 and 3085, the playing device can acquire the data stream cached by the caching device.

Further, the caching device in a scenario shown in FIG. 7 may also be replaced with a blockchain, which is configured to cache the above data stream. Correspondingly, the above steps performed by the caching device may be performed by the blockchain.

In the embodiment of the present disclosure, the process of transmitting data between some devices (or between any two devices) may include data encapsulation and decapsulation, and data verification. For example, in the case that the stream combining device transmits the data stream to the caching device, the stream combining device may also encapsulate the data of the data stream as a data packet, and transmit the data packet to the caching device. The caching device only stores the data packet in response to receiving the data packet. In response to pulling the data packets from the caching device, the stream pulling device needs to decapsulate the data packets to acquire the data of the data packets. Each of the data packets may contain a check bit. In response to receiving the data packet, the stream pulling device checks the data packet based on the check bit.

Figure 8:
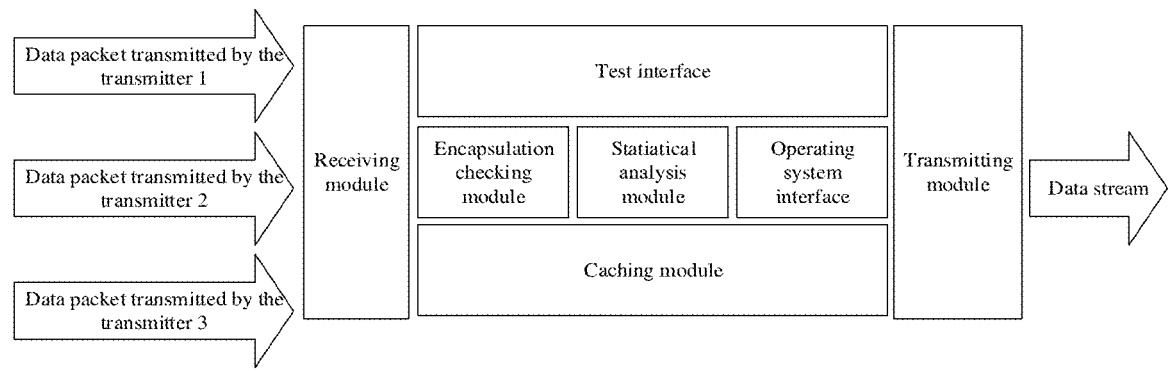
FIG. 8 is a schematic structural diagram of a stream combining device according to an embodiment of the present disclosure.

In an exemplary embodiment, as shown in FIG. 8, the stream combining device includes a receiving module, a statistical analysis module, an encapsulation checking module, a caching module and a transmitting module. The receiving module is configured to receive data packets transmitted by a plurality of transmitters. The statistical analysis module is configured to determine the data packets having the identifier of the one capture device among the received data packets. The encapsulation checking module is configured to encapsulate data in the data packets with the identifier of the same capture device to acquire a second data packet, and add a check bit to the second data packet. The caching module is configured to add the second data packet to the cache queue. The transmitting module is configured to transmit the second data packet in the cache queue to the caching device. The stream combining device may also include some interfaces, such as an operating system interface and a test interface (such as a Swagger UI interface).

Figure 9:
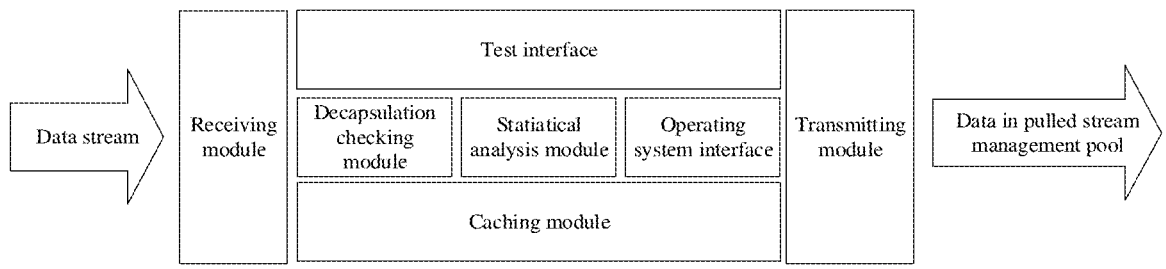
FIG. 9 is a schematic structural diagram of a stream pulling device according to an embodiment of the present disclosure.

As shown in FIG. 9, the stream pulling device includes a receiving module, a statistical analysis module, a decapsulation checking module, a caching module and a transmitting module. The receiving module is configured to receive the data packets in the data stream from the caching device. The decapsulation checking module is configured to decapsulate and check the data packets to acquire the data in the data packets. The caching module is configured to cache the data to the pulled stream management pool. The transmitting module is configured to transmit the data in the pulled stream management pool to the playing device. The statistical analysis module is configured to perform some operations related to statistical analysis. The stream pulling device may also include some interfaces, such as an operating system interface and a test interface.

Figure 10:
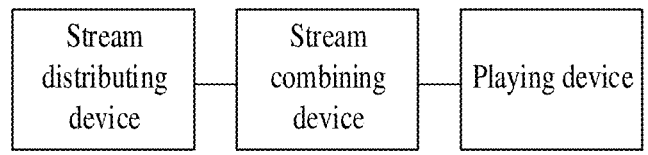
FIG. 10 is a schematic structural diagram of a system for transmitting data according to an embodiment of the present disclosure.

Based on the method for transmitting the data stream provided by the embodiments of the present disclosure, an embodiment of the present disclosure provides a system for transmitting data streams. As shown in FIG. 10, the system for transmitting the data streams includes a stream distributing device, a stream combining device and a playing device.

The stream distributing device includes a plurality of transmitters and is configured to acquire a data stream to be transmitted, acquire, from the data stream, a plurality of data segments corresponding to the plurality of transmitters, and transmit the corresponding data segments to the stream combining device using the plurality of transmitters, wherein each of the transmitters corresponds to at least one data segment, and different transmitters correspond to different data segments.

The stream combining device is configured to combine the plurality of data segments to acquire the data stream and transmit the data stream to the playing device in response to receiving the plurality of data segments.

The playing device is configured to receive the data stream, and then play the data stream.

Optionally, based on FIG. 10 and referring to FIG. 6, the system for transmitting the data stream further includes a capture device and an encoding device, wherein the capture device is configured to collect data of the data stream and transmit the captured data to the encoding device. The encoding device is configured to encode the data transmitted by the capture device to acquire the data stream. The playing device is configured to decode the data stream to acquire data of the data stream, and play the data of the data stream.

Optionally, the system for transmitting the data stream further includes a caching device, wherein the stream combining device is configured to transmit the data stream to the caching device, the caching device is configured to cache the data stream, and the playing device is configured to acquire the data stream cached by the caching device.

Optionally, the system for transmitting the data stream further includes a stream pulling device, wherein the playing device is configured to send an acquiring request for the data stream to the stream pulling device, and the stream pulling device is configured to pull the data stream from the caching device based on the acquiring request and transmit the data stream to the playing device.

Optionally, the system for transmitting the data stream further includes a transfer device, wherein the playing device is configured to send the acquiring request to the stream pulling device through the transfer device, and the stream pulling device is configured to transmit the data stream to the playing device through the transfer device.

In summary, in the system for transmitting the data streams provided by the embodiment of the present disclosure, the stream distributing device transmits the corresponding data segments to the stream combining device using the plurality of transmitters, such that the plurality of transmitters may transmit the data segments to the stream combining device in parallel. The stream combining device may combine the plurality of data segments to the acquire the data stream in response to receiving the plurality of data segments. In this way, the stream distributing device can transmit the data stream to the stream combining device. Because the sum of the bandwidths of the plurality of transmitters is larger, the efficiency of transmitting the data stream by the stream distributing device to the stream combining device is higher.

Figure 11:
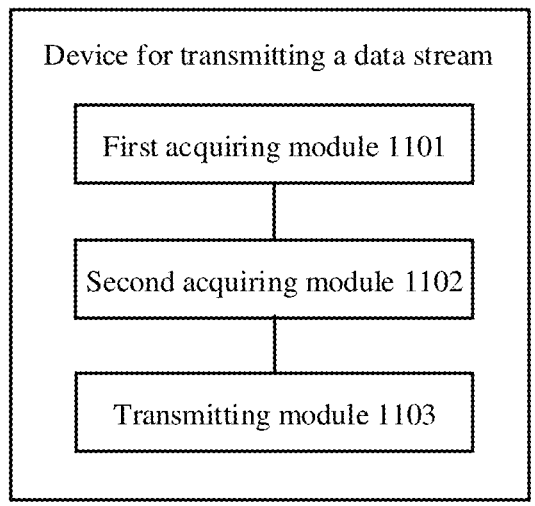
FIG. 11 is a schematic structural diagram of an apparatus for transmitting a data stream according to an embodiment of the present disclosure.

Based on the method for transmitting the data stream provided by the embodiments of the present disclosure, an embodiment of the present disclosure provides an apparatus for transmitting a data stream. The apparatus for transmitting the data stream includes a plurality of transmitters. As shown in FIG. 11, the apparatus for transmitting the data stream includes:
- a first acquiring module 1101, configured to acquire a data stream to be transmitted;
- a second acquiring module 1102, configured to acquire, from the data stream, a plurality of data segments corresponding to the plurality of transmitters, wherein each transmitter corresponds to at least one data segment, and different transmitters correspond to different data segments; and
- a transmitting module 1103, configured to transmit the corresponding data segments to the stream combining device using the plurality of transmitters, such that the stream combining device transmits the data stream to a playing device in response to acquiring the data stream by combining the plurality of data segments.

Optionally, a total length of all data segments corresponding to the transmitters is related to the link parameters corresponding to the transmitters, wherein the link parameters corresponding to the transmitter are parameters of links between the transmitters and the stream combining device.

Optionally, the link parameters corresponding to the transmitters include intensities of signals transmitted on the links between the transmitters and the stream combining device, wherein the total length is positively related to the intensity of the signal.

Optionally, the plurality of data segments have an equal length.

Optionally, at least two of the data segments have different lengths.

Optionally, the transmitting module 1103 is configured to:
acquire a plurality of data packets which is in one-to-one correspondence to the plurality of data segments by encapsulating the plurality of data segments, wherein the data packet corresponding to each of the data segments includes the data segment and a serial number of the data segment, the serial number being configured to indicate an order of the data segment in the plurality of data segments; and
send the data packets the corresponding to the data segments to the stream combining device using the plurality of transmitters.

Optionally, data of the data stream is captured by a capture device, and each of the data packets further includes an identifier of the capture device.

Optionally, the plurality of transmitters include at least some of the transmitters in the stream distributing device. The apparatus for transmitting the data stream further includes:
- a determining module, configured to determine the plurality of transmitters based on the link parameters corresponding to the transmitters,
- wherein the link parameters corresponding to the transmitters are parameters of links between the transmitters and the stream combining device.

Optionally, the link parameters corresponding to the transmitters are configured to reflect the quality of the links between the transmitters and the stream combining device; and
the plurality of transmitters are n transmitters with the highest link quality reflected by the corresponding link parameters in the stream distributing device, n>1.

Optionally, in at least one of the transmitters in the stream distributing device, the number of receive antennas is less than the number of transmit antennas.

In summary, in the apparatus for transmitting the data stream provided by the embodiment of the present disclosure, the transmitting module transmits the corresponding data segments to the stream combining device using the plurality of transmitters, such that the plurality of transmitters may transmit the data segments to the stream combining device in parallel. The stream combining device may combine the plurality of data segments to the acquire the data stream in response to receiving the plurality of data segments. In this way, the stream distributing device can transmit the data stream to the stream combining device. Because the sum of the bandwidths of the plurality of transmitters is larger, the efficiency of transmitting the data stream by the stream distributing device to the stream combining device is higher.

Figure 12:
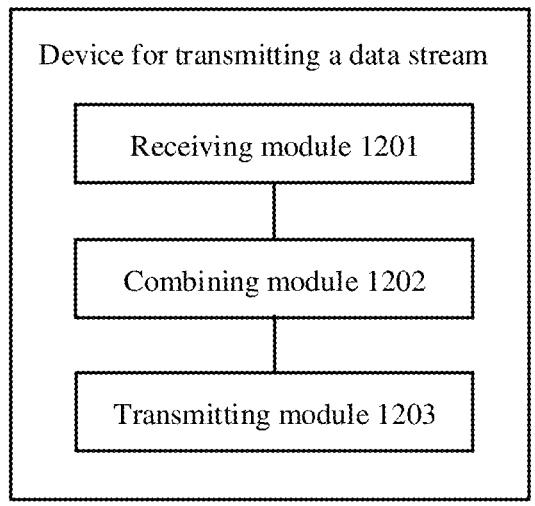
FIG. 12 is a schematic structural diagram of another apparatus for transmitting a data stream according to an embodiment of the present disclosure.

Based on the method for transmitting the data stream provided by the embodiments of the present disclosure, an embodiment of the present disclosure provides another apparatus for transmitting a data stream. As shown in FIG. 12, the apparatus for transmitting the data stream includes:
- a receiving module 1201, configured to receive a plurality of data segments in the data stream transmitted by a stream distributing device using a plurality of transmitters;
- a combining module 1202, configured to acquire the data stream by combining the plurality of data segments; and
- a transmitting module 1203, configured to transmit the data stream to a playing device.

Optionally, the receiving module 1201 is configured to:
receive a plurality of data packets transmitted by the stream distributing device using the plurality of transmitters, wherein the plurality of data packets are in one-to-one correspondence to the plurality of data segments, and the data packet corresponding to each of the data segments includes the data segment and a serial number of the data segment, the serial number being configured to indicate an order of the data segment in the plurality of data segments, and acquire the plurality of data segments and the serial numbers of the plurality of data segments by decapsulating the plurality of data packets.

The combining module 1202 is configured to combine the plurality of data segments according to the orders indicated by the serial numbers of the plurality of data segments to acquire the data stream.

Optionally, data of the data stream is captured by a capture device, and each of the data packets further includes an identifier of the capture device.

In summary, in the apparatus for transmitting the data stream provided by the embodiment of the present disclosure, the receiving module receives the corresponding data segments, which are transmitted by the stream distributing device to the stream combining device using the plurality of transmitters, such that the plurality of transmitters may transmit the data segments to the stream combining device in parallel. The combining module may combine the plurality of data segments to acquire the data stream. In this way, the stream distributing device can transmit the data stream to the stream combining device. Because the sum of the bandwidths of the plurality of transmitters is larger, the efficiency of transmitting the data stream by the stream distributing device to the stream combining device is higher.

Based on the method for transmitting the data stream provided by the embodiment of the present disclosure, an embodiment of the present disclosure provides another device for transmitting data streams. The device for transmitting the data streams may be a stream distributing device. The device for transmitting the data streams includes a processor, a memory and a plurality of transmitters, wherein the memory stores one or more programs therein. The processor, when loading and running the one or more programs stored in the memory, causes the device for transmitting data stream to perform any of the methods for transmitting data stream, applicable to the stream distributing device provided in the embodiments of the present disclosure.

Figure 13:
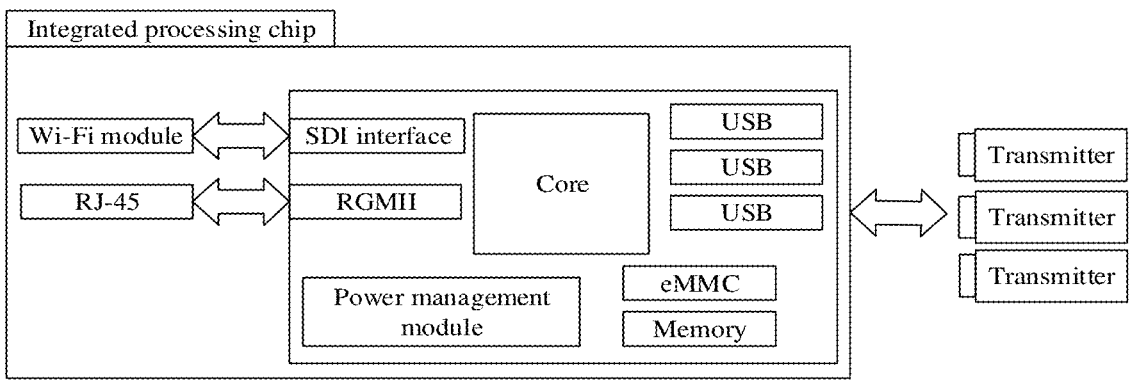
FIG. 13 is a schematic structural diagram of a device for transmitting a data stream according to an embodiment of the present disclosure.

In an exemplary embodiment, as shown in FIG. 13, the device for transmitting data streams may include an integrated processing chip and a plurality of transmitters connected to the processing chip through a USB interface, wherein the integrated processing chip includes the above processor. The processor includes cores (such as 6 cores), an SDI signal input terminal, a reduced Gigabit media independent interface (RGMII), a plurality of universal serial bus (USB) interfaces, a power management module, an embedded multimedia card (eMMC), a memory and other components. The USB interface may be any standard USB interface, such as a USB 3.0 standard USB interface. The plurality of USB interfaces may be connected to the plurality of transmitters in a one-to-one correspondence manner. Optionally, the USB interface may be a pluggable interface, such that the transmitter can be connected to the processor in a pluggable manner.

Continuously referring to FIG. 13, the integrated processing chip may also include a wireless (Wi-Fi) module and an RJ-45 connector, wherein the Wi-Fi module is connected to the SDI signal input terminal, and the RJ-45 connector (a type of connector) is connected to the RGMII.

Based on the method for transmitting data streams provided by the embodiment of the present disclosure, an embodiment of the present disclosure provides another device for transmitting a data stream. The device for transmitting data streams may be a stream distributing device. The device for transmitting data streams includes a processor, a memory and a plurality of transmitters, wherein the memory stores one or more programs therein. The processor, when loading and running the one or more programs stored in the memory, causes the device for transmitting data streams to perform any of the methods for transmitting data streams, applicable to the stream combining device provided in the embodiments of the present disclosure.

An embodiment of the present disclosure further provides a computer storage medium. The computer storage medium is configured to store one or more computer programs therein. The one or more computer programs, when loaded and executed by a computer, causes the computer to perform any method for transmitting data streams, which is performed by a stream distributing device or a stream combining device provided in the embodiments of the present disclosure.

An embodiment of the present disclosure further provides a computer program product. The computer program product, when loaded and run by a computer, causes the computer to perform any method for transmitting data streams, applicable to a stream distributing device or a stream combining device provided in the embodiment of the present disclosure.

In the present disclosure, the terms "first" and "second" are used for descriptive purposes only and are not to be construed as indicating or implying relative importance. The term "at least one" refers to one or more, and the term "a plurality of" refers to two or more, unless otherwise specifically defined.

The method embodiments, the device embodiments and the system embodiments provided by the embodiments of the present disclosure may be cross-referenced, which is not limited in the embodiments of the present disclosure. The sequence of the operations in the method embodiments may be adjusted appropriately, and the operations may be accordingly deleted or added according to the situation. Within the technical scope disclosed in the present disclosure, any variations of the method easily derived by a person skilled in the art shall fall within the protection scope of the present disclosure, which is not repeated here.

In the corresponding embodiments provided in the present disclosure, it should be understood that the disclosed systems, devices, etc. may be implemented by other constitutions. For example, the device embodiments described above are merely schematic. For example, the partitioning of the modules can be a logical functional partitioning. There may be other partitioning modes during actual implementation. For example, multiple modules can be combined or integrated into another system, or some features can be ignored or not executed. In addition, mutual coupling or direct coupling or communication connection that is shown or discussed can be indirect coupling or communication connection through some interfaces, systems or modules, and can be in electrical or other forms.

The units described as separate components may or may not be physically separated, and the components for unit description may or may not be physical units, that is, may be located in one place or distributed on a plurality of devices. Part or all of the units can be selected according to actual needs to achieve the objects of the solutions of the embodiments.

The above are only optional embodiments of the present disclosure, but the protection scope of the present disclosure is not limited thereto. Within the technical scope disclosed in the present disclosure, any equivalent modifications or replacements easily derived by a person skilled in the art shall fall within the protection scope of the present disclosure. Therefore, the protection scope of the present disclosure should be subject to the appended claims.

What is claimed is:

1. A method for transmitting data streams, applicable to a stream distributing device comprising a plurality of transmitters, the method comprising:

acquiring a data stream to be transmitted;

acquiring, from the data stream, a plurality of data segments corresponding to the plurality of transmitters, wherein each of the transmitters corresponds to at least one data segment, and different transmitters correspond to different data segments; and transmitting the corresponding data segments to a stream combining device using the plurality of transmitters, such that the stream combining device transmits the data stream to a playing device in response to acquiring the data stream by combining the plurality of data segments, wherein the acquiring, from the data stream, the plurality of data segments corresponding to the plurality of transmitters comprises:

allocating the plurality of data segments to the plurality of transmitters based on intensities of signals transmitted on links between the plurality of transmitters and the stream combining device and transmission rates of the links between the plurality of transmitters and the stream combining device, wherein a total length of all data segments corresponding to an $i^{th}$ transmitter is $Li=(Si/S)*T*Xi$, wherein $1 \leq i \leq n$, n represents a total number of the plurality of transmitters, Si represents a transmission rate of a link between the $i^{th}$ transmitter and the stream combining device, S represents a sum of transmission rates of links between n transmitters and the stream combining device, T represents a total length of the data stream, and Xi represents a ratio of an intensity of a signal transmitted on the link between the $i^{th}$ transmitter and the stream combining device to a total signal intensity, the total signal intensity being a sum of intensities of signals transmitted on links between the n transmitters and the stream combining device.

2. The method according to claim 1, wherein the plurality of data segments have an equal length.

3. The method according to claim 1, wherein at least two of the data segments have different lengths.

4. The method according to claim 1, wherein transmitting the corresponding data segments to the stream combining device using the plurality of transmitters comprises:

acquiring a plurality of data packets which are in one-to-one correspondence to the plurality of data segments by encapsulating the plurality of data segments, wherein the data packet corresponding to each of the data segments comprises the data segment and a serial number of the data segment, the serial number being configured to indicate an order of the data segment in the plurality of data segments; and transmitting the data packets corresponding to the data segments to the stream combining device using the plurality of transmitters.

5. The method according to claim 4, wherein data of the data stream is captured by a capturing device, and each of the data packets further comprises an identifier of the capture device.

6. The method according to claim 1, wherein in at least one of the transmitters in the stream distributing device, the number of receive antennas is less than the number of transmit antennas.

7. A device for transmitting data streams, comprising: a processor, a memory, and a plurality of transmitters; wherein the memory is configured to store one or more programs therein; and the processor, when loading and running the one or more programs stored in the memory, is caused to perform the method for transmitting data streams as defined in claim 1.

8. A non-transitory computer-readable storage medium, storing one or more computer programs therein;

wherein the one or more computer programs, when loaded and run by a computer, cause the computer to perform the method for transmitting data streams as defined in claim 1.

9. A method for transmitting a data stream, applicable to a stream combining device, the method comprising:

receiving a plurality of data segments transmitted by a stream distributing device using a plurality of transmitters;

acquiring a data stream by combining the plurality of data segments; and transmitting the data stream to a playing device, wherein an allocation manner of the plurality of data segments transmitted by the plurality of transmitters comprises:

allocating the plurality of data segments to the plurality of transmitters based on intensities of signals transmitted on links between the plurality of transmitters and the stream combining device and transmission rates of the links between the plurality of transmitters and the stream combining device, wherein a total length of all data segments corresponding to an $i^{th}$ transmitter is $Li=(Si/S)*T*Xi$, wherein $1 \leq i \leq n$, n represents a total number of the plurality of transmitters, Si represents a transmission rate of a link between the $i^{th}$ transmitter and the stream combining device, S represents a sum of transmission rates of links between n transmitters and the stream combining device, T represents a total length of the data stream, and Xi represents a ratio of an intensity of a signal transmitted on the link between the $i^{th}$ transmitter and the stream combining device to a total signal intensity, the total signal intensity being a sum of intensities of signals transmitted on links between the n transmitters and the stream combining device.

10. The method according to claim 9, wherein receiving the plurality of data segments transmitted by the stream distributing device using the plurality of transmitters comprises:

receiving a plurality of data packets transmitted by the stream distributing device using the plurality of transmitters, wherein the plurality of data packets are in one-to-one correspondence to the plurality of data segments, and the data packet corresponding to each of the data segments comprises the data segment and a serial number of the data segment, the serial number being configured to indicate an order of the data segment in the plurality of data segments; and acquiring the plurality of data segments and the serial numbers of the plurality of data segments by decapsulating the plurality of data packets; and acquiring the data stream by combining the plurality of data segments comprises;
acquiring the data stream by combining the plurality of data segments based on the orders indicated by the serial numbers of the plurality of data segments.

11. The method according to claim 10, wherein data of the data stream is captured by a capture device, and each of the plurality of data packets comprises an identifier of the capture device.

12. A device for transmitting data streams, comprising: a processor and a memory; wherein
the memory is configured to store one or more programs therein; and
the processor, when loading and running the one or more programs stored in the memory, is caused to perform the method for transmitting data streams as defined in claim 9.

13. A non-transitory computer-readable storage medium, storing one or more computer programs therein;
wherein the one or more computer programs, when loaded and run by a computer, causes the computer to perform the method for transmitting data streams as defined in claim 9.

14. A system for transmitting data streams, comprising: a stream distributing device, a stream combining device, and a playing device; wherein
the stream distributing device comprises a plurality of transmitters and is configured to acquire a data stream to be transmitted, acquire, from the data stream, a plurality of data segments corresponding to the plurality of transmitters, and transmit the corresponding data segments to the stream combining device using the plurality of transmitters, wherein each of the transmitters corresponds to at least one data segment, and different transmitters correspond to different data segments, wherein the acquiring, from the data stream, the plurality of data segments corresponding to the plurality of transmitters comprises: allocating the plurality of data segments to the plurality of transmitters based on intensities of signals transmitted on links between the plurality of transmitters and the stream combining device and transmission rates of the links between the plurality of transmitters and the stream combining device, wherein a total length of all data segments corresponding to an $i^{th}$ transmitter is $L_i=(S_i/S)*T*X_i$, wherein $1 \leq i \leq n$, n represents a total number of the plurality of transmitters, $S_i$ represents a transmission rate of a link between the $i^{th}$ transmitter and the stream combining device, S represents a sum of transmission rates of links between n transmitters and the stream combining device, T represents a total length of the data stream, and $X_i$ represents a ratio of an intensity of a signal transmitted on the link between the $i^{th}$ transmitter and the stream combining device to a total signal intensity, the total signal intensity being a sum of intensities of signals transmitted on links between the n transmitters and the stream combining device;
the stream combining device is configured to acquire the data stream by combining the plurality of data segments and transmit the data stream to the playing device in response to receiving the plurality of data segments; and
the playing device is configured to play the data stream in response to receiving the data stream.

15. The system according to claim 14, further comprising a capture device and an encoding device, wherein the capture device is configured to collect data of the data stream and transmit the captured data to the encoding device; the encoding device is configured to acquire the data stream by encoding the data transmitted by the capture device; and the playing device is configured to acquire the data of the data stream by decoding the data stream, and play the data in the data stream.

16. The system according to claim 14, further comprising a caching device, wherein the stream combining device is configured to transmit the data stream to the caching device, the caching device is configured to cache the data stream, and the playing device is configured to acquire the data stream cached by the caching device.

* * * * *